United States Patent
Lim et al.

(10) Patent No.: US 11,401,417 B2
(45) Date of Patent: Aug. 2, 2022

(54) POLYAMIDE COMPOSITION COMPRISING A SPECIFIC CO-POLYAMIDE COMPRISING CAPROLACTAM MONOMER, A SEMI-CRYSTALLINE POLYAMIDE AND A REINFORCING FILLER WITH ENHANCED GLOSS PERFORMANCE

(71) Applicant: BASF SE, Ludwigshafen am Rhein (DE)

(72) Inventors: Mok-Keun Lim, Seoul (KR); Franco Speroni, Ospiate di Bollate (IT)

(73) Assignee: BASF SE, Ludwigshafen am Rhein (DE)

(*) Notice: Subject to any disclaimer, the term of this patent is extended or adjusted under 35 U.S.C. 154(b) by 0 days.

(21) Appl. No.: 16/955,536

(22) PCT Filed: Dec. 20, 2018

(86) PCT No.: PCT/EP2018/086220
§ 371 (c)(1),
(2) Date: Jun. 18, 2020

(87) PCT Pub. No.: WO2019/122141
PCT Pub. Date: Jun. 27, 2019

(65) Prior Publication Data
US 2021/0079217 A1   Mar. 18, 2021

(30) Foreign Application Priority Data
Dec. 21, 2017  (EP) .................................... 17306859

(51) Int. Cl.
| | | |
|---|---|---|
| *C08L 77/02* | (2006.01) | |
| *B29C 48/00* | (2019.01) | |
| *B29C 45/00* | (2006.01) | |
| *C08G 69/14* | (2006.01) | |
| *C08K 3/013* | (2018.01) | |
| *B29K 77/00* | (2006.01) | |
| *B29K 509/08* | (2006.01) | |
| *C08K 3/40* | (2006.01) | |
| *C08K 5/00* | (2006.01) | |
| *C08K 7/14* | (2006.01) | |

(52) U.S. Cl.
CPC .......... *C08L 77/02* (2013.01); *B29C 45/0001* (2013.01); *B29C 48/022* (2019.02); *C08G 69/14* (2013.01); *B29K 2077/00* (2013.01); *B29K 2509/08* (2013.01); *C08K 3/013* (2018.01); *C08K 3/40* (2013.01); *C08K 5/005* (2013.01); *C08K 5/0016* (2013.01); *C08K 5/0025* (2013.01); *C08K 7/14* (2013.01)

(58) Field of Classification Search
CPC ................. C08L 77/02; C08L 2205/02; C08L 2205/025; C08L 2205/03
See application file for complete search history.

(56) References Cited

U.S. PATENT DOCUMENTS

| | | |
|---|---|---|
| 4,410,661 A | 10/1983 | Epstein et al. |
| 6,156,838 A | 5/2000 | Yoshikawa et al. |
| 6,121,445 A | 9/2000 | Suzuki et al. |
| 6,255,371 B1 | 7/2001 | Schlosser et al. |
| 2016/0289448 A1 | 1/2016 | Jeol et al. |

FOREIGN PATENT DOCUMENTS

| | | |
|---|---|---|
| DE | 3200428 A1 | 7/1983 |
| EP | 0 583 706 A1 | 2/1994 |
| EP | 0699708 A2 | 3/1996 |
| WO | 9808898 A1 | 3/1998 |
| WO | 9839306 A1 | 9/1998 |
| WO | 9845364 A1 | 10/1998 |

OTHER PUBLICATIONS

EP 0583706 machine translation (Feb. 1994).*
International Search Report and Written Opinion for corresponding PCT/EP2018/086220 dated Mar. 20, 2019, 8 Pages.

* cited by examiner

*Primary Examiner* — Ana L. Woodward
(74) *Attorney, Agent, or Firm* — Armstrong Teasdale LLP

(57) ABSTRACT

Described herein is a composition including a) at least one co-polyamide including caprolactam monomer or the corresponding amino acid, at least one aromatic diacid co-monomer and at least one cycloaliphatic diamine co-monomer; b) at least one semi-crystalline polyamide; and c) at least one reinforcing filler. The a) at least one co-polyamide has a crystallization temperature ($T_c$) of 150° C. or less and the difference between the melting temperature ($T_m$) and $T_c$ of 50° C. or more.

17 Claims, No Drawings

POLYAMIDE COMPOSITION COMPRISING A SPECIFIC CO-POLYAMIDE COMPRISING CAPROLACTAM MONOMER, A SEMI-CRYSTALLINE POLYAMIDE AND A REINFORCING FILLER WITH ENHANCED GLOSS PERFORMANCE

CROSS-REFERENCE TO RELATED APPLICATIONS

This application is a U.S. National Phase Application of PCT/EP2018/086220, filed on Dec. 20, 2018, which claims the benefit of priority to European Patent Application Number 17306859.4, filed Dec. 21, 2017, the entire contents of which are hereby incorporated by reference herein.

FIELD OF THE INVENTION

The present invention relates to a polyamide composition comprising a) at least one co-polyamide comprising caprolactam monomer or the corresponding amino acid, at least one aromatic diacid co-monomer and at least one cycloaliphatic diamine co-monomer; b) at least one semi-crystalline polyamide; and c) at least one reinforcing filler, optionally with d) at least one amorphous polyamide, wherein a) at least one co-polyamide has the crystallization temperature (Tc) of 150° C. or less and the difference between the melting temperature (Tm) and Tc of 50° C. or more, and also to a process for manufacturing such a polyamide composition.

The present invention also relates to a process for producing the polyamide composition according to the present invention, which comprises melt-blending the a) at least one co-polyamide, the b) at least one semi-crystalline polyamide, and the c) at least one reinforcing filler.

The present invention also relates to molded parts produced by injection or extrusion molding of the present composition.

Further aspect of the present invention relates to a use of the molded parts to produce housings or housing parts in various applications, including automotive applications, industrial machines, appliances, and electrical and electronic applications, preferably automotive side mirror base plates, aesthetic parts, mobile phone frames, engine beauty covers, notebook frames, circuit breaker cases, magnetic switches, contactors, and connectors for electrical and electronic devices, including photovoltaic power transmission devices and electrical vehicles, which require good surface features including excellent gloss performance during its service life, and also to said housings or housing parts.

BACKGROUND OF THE INVENTION

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

A polyamide is one of the polymers which are frequently used as engineering plastics for a very wide range of applications. A polyamide composition is of significant commercial interest and may be used to produce diverse articles in various applications, including automotive applications, industrial machines, appliances, electrical and electronic applications, etc., generally by injection or extrusion molding.

In general, in order to use a polyamide composition in producing certain articles, fillers are often added to ensure mechanical properties of the products. However, a polyamide composition comprising fillers and the products manufactured therefrom generally show unsatisfactory gloss performance and surface appearance due to the presence of fillers so that it's difficult to use such a polyamide composition in producing an article in a certain application, where both gloss performance and surface appearance are considered as being essential in assessing its value as a product in the market. Also, certain modifications in the production process, material fluctuations and many other circumstances may cause differences in the gloss performance and surface appearance of the product to be produced, which quite often results in complaints or even receipt rejections of the products after quality check by the customers.

Particular applications, which require a constant surface quality and notably excellent gloss performance during their service life, such as automotive applications, industrial machines, appliances, and electrical and electronic applications, preferably automotive side mirror base plates, aesthetic parts, mobile phone frames, engine beauty covers, notebook frames, circuit breaker cases, magnetic switches, contactors, and connectors for electrical and electronic devices, including photovoltaic power transmission devices and electrical vehicles, require a polyamide composition which may ensure excellent gloss performance and surface appearance.

Accordingly, a polymer composition, which can exhibit excellent gloss performance for satisfactory surface appearance, while maintaining mechanical properties, is required in this technology field.

DESCRIPTION OF THE INVENTION

The object of the present invention is therefore to provide a polyamide composition exhibiting excellent gloss performance and better surface appearance, while maintaining satisfactory mechanical properties.

The present invention relates to a composition comprising a) at least one co-polyamide comprising caprolactam monomer or the corresponding amino acid, at least one aromatic diacid co-monomer and at least one cycloaliphatic diamine co-monomer; b) at least one semi-crystalline polyamide; c) at least one reinforcing filler, and d) at least one amorphous polyamide, wherein a) at least one co-polyamide has the crystallization temperature ($T_c$) of 150° C. or less and the difference between the melting temperature ($T_m$) and $T_c$ of 50° C. or more.

Indeed, it has been surprisingly found by the present inventors that the presence of a specific co-polyamide a) makes it possible to exhibit excellent gloss performance, optionally in combination with d) an amorphous polyamide.

One of the essential features of the present invention is that excellent gloss performance is accomplished by incorporating such a specific co-polyamide a) according to the present invention into a polyamide composition, optionally in combination with d) an amorphous polyamide, while maintaining satisfactory mechanical properties, e.g., tensile/flexural modulus, tensile/flexural stress, impact strength, elongation at break, etc.

The International Committee of Illumination (CIE) defines the term "gloss" as a phenomenon where bright reflex lights or images of bright objects are seen on a surface, created by the surface's directional reflectivity. In other words, gloss is an optical property of a surface, characterized by its ability to reflect light in a specular manner.

Because gloss perception by human eyes is subjective, that is, not a physical characteristic, however, an objective standard for gloss measurement is required.

An objective assessment of the gloss performance may be obtained by using different types of glossmeter in accordance with various international standards, e.g., ISO 2813, DIN 67530, ASTM D 523 and BS 3900 Part D5, which are used in the industries for the control of gloss quality so as to ensure the consistency of the product through their manufacturing processes and during its service life.

A glossmeter is an instrument which is used to measure specular reflection gloss of a surface. Gloss is determined by projecting a beam of light at a fixed intensity and angle onto a surface and measuring the amount of reflected light at an equal, but opposite angle. In other words, a glossmeter is used to measure the gloss degree of the light share reflected from the surface in the complementary direction to the incident angle.

The glossmeter hence may provide a quantifiable way of measuring gloss intensity, which may ensure consistency of gloss measurement by defining the precise illumination and viewing conditions. Measurement angle refers to the angle between the incident light and the perpendicular, which relates to the amount of reflected light from a black glass standard with a defined refractive index. The ratio of reflected light to incident light for the specimen, compared to the ratio for the gloss standard, is recorded as gloss units ("GU"). Three measurement angles (20°, 60°, and 85°) are specified to cover the majority of industrial coatings applications.

In the present invention, the term "polyamide" is intended to denote, in particular, a polyamide comprising recurring units complying with any of formula (I) or formula (II) [recurring units ($R_{PA}$)]:

$$-NH-R^1-CO- \quad \text{formula (I):}$$

$$-NH-R^2-NH-CO-R^3-CO-, \quad \text{formula (II):}$$

wherein:
- $R^1$, equal to or different from each other at each occurrence, is a divalent hydrocarbon group having from 1 to 17 carbon atoms;
- $R^2$, equal to or different from each other at each occurrence, is a divalent hydrocarbon group having from 1 to 18 carbon atoms; and
- $R^3$, equal to or different from each other at each occurrence, is a divalent hydrocarbon group having from 1 to 16 carbon atoms.

Recurring units ($R_{PA}$) of the polyamide can be notably obtained through polycondensation reaction of (1) one of β-lactam, 5-amino-pentanoic acid, ε-caprolactam, 9-aminononanoic acid, 10-aminodecanoic acid, 11-aminoundecanoic acid, 12-aminododecanoic acid and/or polycondensation reaction of (2) at least one of oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], adipic acid [HOOC—(CH$_2$)$_4$—COOH], 2,4,4-trimethyl-adipic acid 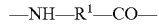—CH$_2$—C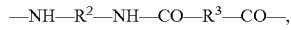—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tetradecandioic acid [HOOC—(CH$_2$)$_{12}$—COOH], octadecandioic acid [HOOC—(CH$_2$)$_{16}$—COOH], terephthalic acid, isophthalic acid, 1,8-naphthalenedicarboxylic acid, 2,6-naphthalenedicarboxylic acid, 5-hydroxyisophthalic acid, 5-sulfoisophthalic acid, 5-aminoisophthalic acid and biphenyl-2,2'-dicarboxylic acid with at least one of diamines, such as 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane, 1,12-diaminododecane, isophorondiamine, bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane, 4,4'-diaminodicyclohexylmethane, 4,4'-diamino-3,3'-dimethyldicyclohexylmethane, 1,2-diaminocyclohexane, 1,4-diaminocyclohexane, 4-amino-2,2,6,6-tetramethylpiperidine, piperazine, N-(2-aminoethyl)piperazine, and N,N'-bis(2-aminoethyl)piperazine.

Exemplary recurring units ($R_{PA}$) of the polyamide are notably:
- (i) —NH—(CH$_2$)$_5$—CO—, i.e. recurring units which can be notably obtained via polycondensation reaction of 8-caprolactam;
- (ii) —NH—(CH$_2$)$_8$—CO—, i.e. recurring units which can be notably obtained via polycondensation reaction of 9-aminononanoic acid;
- (iii) —NH—(CH$_2$)$_9$—CO—, i.e. recurring units which can be notably obtained via polycondensation reaction of 10-aminodecanoic acid;
- (iv) —NH—(CH$_2$)$_{10}$—CO—, i.e. recurring units which can be notably obtained via polycondensation reaction of 11-aminoundecanoic acid;
- (v) —NH—(CH$_2$)$_{11}$—CO—, i.e. recurring units which can be notably obtained via polycondensation reaction of laurolactam;
- (vi) —NH—(CH$_2$)$_6$—NH—CO—(CH$_2$)$_4$—CO—, i.e. recurring units which can be notably obtained via polycondensation reaction of hexamethylene diamine and adipic acid;
- (vii) —NH—(CH$_2$)$_6$—NH—CO—(CH$_2$)$_8$—CO—, i.e. recurring units which can be notably obtained via polycondensation reaction of hexamethylene diamine and sebacic acid;
- (viii) —NH—(CH$_2$)$_6$—NH—CO—(CH$_2$)$_{10}$—CO—, i.e. recurring units which can be notably obtained via polycondensation reaction of hexamethylene diamine and dodecanoic acid;
- (ix) —NH—(CH$_2$)$_{10}$—NH—CO—(CH$_2$)$_{10}$—CO—, i.e. recurring units which can be notably obtained via polycondensation reaction of decamethylene diamine and dodecanoic acid;

(x) —NH—(CH$_2$)$_6$—NH—CO—(CH$_2$)$_7$—CO—, i.e. recurring units which can be notably obtained via polycondensation reaction of hexamethylene diamine and azelaic acid (otherwise known as nonandioic acid);

(xi) —NH—(CH$_2$)$_{12}$—NH—CO—(CH$_2$)$_{10}$—CO—, i.e. recurring units which can be notably obtained via polycondensation reaction of dodecamethylene diamine and dodecanoic acid;

(xii) —NH—(CH$_2$)$_{10}$—NH—CO—(CH$_2$)$_8$—CO—, i.e. recurring units which can be notably obtained via polycondensation reaction of decamethylene diamine and decanoic acid;

(xiii) —NH—(CH$_2$)$_4$—NH—CO—(CH$_2$)$_4$—CO—, i.e. recurring units which can be notably obtained via polycondensation reaction of 1,4-butanediamine and adipic acid; and (xvi) —NH—(CH$_2$)$_4$—NH—CO—(CH$_2$)$_8$—CO—, i.e. recurring units which can be notably obtained via polycondensation reaction of 1,4-butanediamine and sebacic acid.

Preferably, the polyamide consists essentially of recurring units (R$_{PA}$), as above detailed, being understood that end-chain, defects and other irregularities can be present in the polyamide chain, without affecting the properties thereof.

Recurring units (R$_{PA}$) of the polyamide can be all of the same type, or can be of more than one type, that is to say that the polyamide (PA) can be a homo-polyamide or a co-polyamide.

In the present invention, the term "co-polyamide comprising caprolactam monomer or the corresponding amino acid, at least one aromatic diacid co-monomer and at least one cycloaliphatic diamine co-monomer" is intended to denote, in particular, a co-polyamide obtained by polymerizing caprolactam or the corresponding amino acid as major monomer, and at least one aromatic diacid co-monomer and at least one cycloaliphatic diamine co-monomer. The aromatic diacid co-monomer is capable of forming an amide bond with an amine function of the cycloaliphatic diamine co-monomer and is capable of bonding covalently to the major monomers of the co-polyamide by amide bond to form a co-polyamide. The amine function of the cycloaliphatic diamine co-monomer is preferably a primary amine function or salt thereof.

An aromatic diacid co-monomer according to the invention is a co-monomer comprising at least one aromatic ring and at least two carboxylic acids. The aromatic diacid co-monomer preferably comprises from 6 to 20 carbon atoms.

Examples of the aromatic diacid co-monomer include terephthalic acid, isophthalic acid, 1,8-naphthalenedicarboxylic acid, 2,6-naphthalenedicarboxylic acid, 5-hydroxyisophthalic acid, 5-sulfoisophthalic acid, 5-aminoisophthalic acid and biphenyl-2,2'-dicarboxylic acid.

A cycloaliphatic diamine co-monomer according to the invention is a co-monomer comprising at least one aliphatic ring and at least two amines. The cycloaliphatic diamine co-monomer preferably comprises from 4 to 20 carbon atoms.

Examples of the cycloaliphatic diamine co-monomer include isophorondiamine, bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane, 4,4'-diaminodicyclohexylmethane, 4,4'-diamino-3,3'-dimethyldicyclohexylmethane, 1,2-diaminocyclohexane, 1,4-diaminocyclohexane, 4-amino-2,2,6,6-tetramethylpiperidine, piperazine, N-(2-aminoethyl)piperazine, and N,N'-bis(2-aminoethyl)piperazine.

The co-polyamide according to the invention may be manufactured by conventional polymerization process, particularly by continuous or batch-wise polymerization process.

Examples of the co-polyamide according to the invention include, but are not limited to, a co-polyamide 6 comprising a mixture of terephthalic acid and isophorondiamine as co-monomers and a co-polyamide 6 comprising a mixture of isophthalic acid and isophorondiamine as co-monomers.

In a particular embodiment of the present invention, an amount of a) at least one co-polyamide comprising caprolactam monomer or the corresponding amino acid, at least one aromatic diacid co-monomer and at least one cycloaliphatic diamine co-monomer is from 2.0 wt % to 30.0 wt %, preferably from 3.0 wt % to 20.0 wt %, and more preferably 5.0 wt % to 15.0 wt % with respect to the total weight of the composition.

In a particular embodiment of the present invention, an amount of caprolactam monomer or the corresponding amino acid in a) at least one co-polyamide is at least 75 mol %, preferably at least 85 mol %, more preferably at least 90 mol %, and most preferably at least 95 mol % based on the total number of moles of monomers and co-monomers.

In a particular embodiment of the present invention, an amount of a mixture of aromatic diacid co-monomer and cycloaliphatic diamine co-monomer in a) at least one co-polyamide is 25 mol % or less, preferably 15 mol % or less, more preferably 10 mol % or less, and most preferably 5 mol % or less, based on the total number of moles of monomers and co-monomers In the present invention, the term "semi-crystalline polyamide" is intended to denote, in particular, a polyamide comprising a crystallizable portion and an amorphous portion in the skeleton, i.e., an amorphous polymeric material contains randomly entangled chains and a crystalline material contains domains in which the polymer chains are packed in an ordered array, where these crystalline domains are embedded in an amorphous polymer matrix. The semi-crystalline polyamide of the present invention has a melting point greater than 150° C. and a heat of fusion greater than 5 J/g. The melting point may be measured by any known method, for example, differential scanning calorimeter (DSC).

Examples of b) at least one semi-crystalline polyamide suitable for being used in the present invention comprise, but are not limited to, polyamide 6, polyamide 6,6, polyamide 6,10, polyamide 4,6, polyamide 11, polyamide 12, polyamide 6,12, co-polyamide 6,6/6T, co-polyamide 6,10/6T, co-polyamide 6,12/6T, co-polyamide 12/6T, co-polyamide 6/6T, and any combinations thereof. Particularly preferred semi-crystalline polyamide to be used in the composition of the present invention is polyamide 6, polyamide 6,6 and co-polyamide 6,6/6T.

Particularly preferred semi-crystalline polyamide to be used in the composition of the present invention is co-polyamide 6,6/6T having a molar ratio of polyamide 6,6 to polyamide 6T between 4:1 and 1:1, preferably about 2:1.

One or more than one semi-crystalline polyamide can be used in the composition. Hence, according to certain embodiments, mixtures of semi-crystalline polyamides can be used.

In a particular embodiment of the present invention, an amount of b) at least one semi-crystalline polyamide is from 15 wt % to 83.0 wt % with respect to the total weight of the composition. Preferably, the amount of at least one semi-crystalline polyamide may be from 18.0 wt % to 77.0 wt %, more preferably 30.0 wt % to 55.0 wt % with respect to the total weight of the composition.

In the present invention, the term "reinforcing filler" is intended to denote, in particular, a material added to a polymer composition to improve its properties and/or to reduce the cost. By appropriately selecting these materials, not only the economics but also other properties such as processing and mechanical behavior can be improved. Although these reinforcing fillers retain their inherent characteristics, very significant differences are often seen depending on the molecular weight, compounding technique and the presence of other additives in the formulation. Therefore, once the basic property requirements are established, the optimum type and the loading level of the filler for the balance between cost and performance must be determined.

In the present invention, the filler is preferably selected from the group consisting of glass fibres, glass beads, calcium carbonate, silicates, talc, kaolin, wollastonite, mica, wood powders, and powders and fibres of other natural products, and synthetic fibres. Glass fibres are most advantageously used in the composition of the present invention.

In a particular embodiment of the present invention, an amount of c) at least one reinforcing filler is from 15.0 to 70.0 wt %, preferably from 20.0 and 55.0 wt % with respect to the total weight of the composition.

The composition according to the present invention may optionally comprise d) at least one amorphous polyamide. In the present invention, the term "amorphous polyamide" is intended to denote, in particular, a polyamide, which has a heat of fusion of less than 5 J/g, preferably 0 J/g, i.e., no detectable melting point, and exhibits superior transparency and good barrier properties to gases such as $O_2$ and $CO_2$, water, solvents, etc. The amorphous polyamide retards the rate of crystallization and thus results in a superior surface appearance. Examples of the amorphous polyamide suitable for being used in the present invention comprise, but are not limited to, polyamide 6I/6T, polyamide 6I/10T, bis-4-(amino-3-methyl-cyclohexyl)-methane (3,3'-diemthyl-4,4'-diaminodicyclohexylmethane) (MACM), and mixtures and co-polyamides thereof, preferably polyamide 6I/6T. Polyamide 6I/6T, which may be prepared by copolymerization of 1,6-hexamethylene diamine, isophthalic acid and terephthalic acid, is most advantageously used in the composition of the present invention. Selar® polyamide 6I/6T may be mentioned as a suitable commercial amorphous polyamide, which can be used in the composition of the present invention.

In the present invention, an amount of d) at least one amorphous polyamide may be up to 20.0 weight % (wt %), for example from 0.1 to 20 wt %, preferably up to 15.0 wt %, for example from 0.5 to 15 wt %, more preferably up to 12.0 wt %, for example from 1 to 12 wt %, and most preferably up to 10.0 wt %, for example from 1 to 10 wt %, with respect to the total weight of the composition. In preferred embodiments, the range of concentration by weight of d) at least one amorphous polyamide is from 3.0 to 20.0 wt %, preferably from 3.0 to 12.0 wt % and more preferably from 4.0 wt % to 10.0 wt % with respect to the total weight of the composition.

The composition according to the present invention may optionally comprise e) at least one flame retardant, which is generally used in the polyamide field. In the present invention, the term "flame retardant" is intended to denote, in particular, a compound which makes it possible to reduce flame propagation and/or which have fire-retardant properties, which are well known to those skilled in the art. These flame retardants are normally used in fire-retardant compositions. Advantageously, the composition comprises at least one flame retardant chosen from the group comprising:

Phosphorus-containing flame retardants, such as:
phosphine oxides, for instance triphenylphosphine oxide, tris(3-hydroxypropyl)phosphine oxide and tris(3-hydroxy-2-methylpropyl)phosphine oxide;
phosphonic acids or salts thereof or phosphinic acids or salts thereof, for instance zinc, magnesium, calcium, aluminum or manganese salts of phosphinic acids, in particular the aluminum salt of diethylphosphinic acid or the zinc salt of dimethylphosphinic acid;
cyclic phosphonates, such as cyclic diphosphate esters, for instance Antiblaze 1045;
phosphates, such as triphenyl phosphate, ammonium polyphosphate, melamine polyphosphate and sodium polyphosphate;
red phosphorus, whether, for example, in stabilized or coated form, as a powder or in the form of master batches;
Flame retardants of the organo-nitrogen compound type, for instance triazines, cyanuric acid and/or isocyanuric acid, melamine or derivatives thereof, such as melamine cyanurate, melamine oxalate, phthalate, borate, sulfate, phosphate, polyphosphate and/or pyrophosphate, condensed melamine products, such as melem, melam and melon, tri(hydroxyethyl) isocyanurate, benzoguanamine, guanidine, allantoin and glycoluril;
Flame retardants containing halogenated derivatives, such as:
bromine derivatives, for instance PBDPOs (polybromodiphenyl oxides), BrPS (polybromostyrene and brominated polystyrene), poly(pentabromobenzyl acrylate), brominated indane, tetradecabromodiphenoxybenzene (Saytex 120), 1,2-bis(pentabromophenyl)ethane or Saytex 8010 from Albemarle, tetrabromobisphenol A and brominated epoxy oligomers. Mention may in particular be made, among brominated derivatives, of polydibromostyrene, such as PDBS-80 from Chemtura, brominated polystyrenes, such as Saytex HP 3010 from Albemarle or FR-803P from Dead Sea Bromine Group, decabromodiphenyl ether (DBPE) or FR-1210 from Dead Sea Bromine Group, octabromodiphenyl ether (OBPE), 2,4,6-tris(2,4,6-tribromophenoxy)-1,3,5-triazine or FR-245 from Dead Sea Bromine Group, poly(pentabromobenzyl acrylate) or FR-1025 from Dead Sea Bromine Group, and epoxy-terminated oligomers or polymers of tetrabromobisphenol A, such as F-2300 and F2400 from Dead Sea Bromine Group.
chlorinated compounds, for instance a chlorinated cycloaliphatic compound, such as Dechlorane Plus® (sold by OxyChem, see CAS 13560-89-9).

These compounds may be used alone or in combination, sometimes in a synergistic manner. Preference is given in particular to a synergistic combination of phosphorus-comprising compounds, such as phosphine oxides, phosphonic acids or salts thereof or phosphinic acids or salts thereof, and cyclic phosphonates, with nitrogen-comprising derivatives, such as melam, melem, melamine phosphate, melamine polyphosphates, melamine pyrophosphates or ammonium polyphosphates.

Preference is especially given to a composition according to the invention comprising a compound F1 of formula:

$$[R^1R^2P(=O)-O]_z^- M^{z+}$$

in which:

$R^1$ and $R^2$ are identical or different and represent a linear or branched alkyl chain comprising from 1 to 6 carbon atoms and preferably from 1 to 3 carbon atoms, and/or an aryl radical;

M represents a calcium, magnesium, aluminum and/or zinc ion, preferably a magnesium and/or aluminum ion;

Z represents 2 or 3, preferably 3.

The composition of the invention may also comprise a compound F2 which is a product of reaction between phosphoric acid and melamine and/or a product of reaction between phosphoric acid and a condensed melamine product.

The composition of the invention may also comprise the compounds F1 and F2.

Such a fire-retardant system is described especially in U.S. Pat. No. 6,255,371. The composition may comprise from 1.0 to 70.0 wt % of this fire-retardant system, preferably from 5.0 to 40.0 wt %, even more preferably from 10.0 to 30.0 wt % and particularly from 15.0 to 30.0 wt % relative to the total weight of the composition. Preferably, the weight ratio of compounds F1 and F2 is, respectively, between 1:1 and 4:1 and preferably about 3:2.

$R^1$ and $R^2$ may be identical or different and represent a methyl, ethyl, n-propyl, isopropyl, n-butyl, tert-butyl, n-pentyl and/or aryl, for instance a phenyl. M is preferably an aluminum ion. The phosphinic acid of compound F1 may be chosen, for example, from the group consisting of dimethylphosphinic acid, ethylmethyl phosphinic acid, diethylphosphinic acid and methyl-n-propylphosphinic acid, or a mixture thereof. Various phosphonic acids may be used in combination.

The phosphinic acid salts according to the invention may be prepared according to the usual methods that are well known to those skilled in the art, for instance that described in patent EP 0 699 708. The phosphinic acid salts according to the invention may be used in various forms depending on the nature of the polymer and on the desired properties. For example, to obtain good dispersion in the polymer, a phosphinic acid salt may be in the form of fine particles.

Compound F2 is a product of reaction between phosphoric acid and melamine and/or a product of reaction between phosphoric acid and a condensed melamine product. Various compounds F2 may be used in combination. The condensed melamine products are, for example, melam, melem and melon. Even more condensed compounds may also be used. Preferably, compound F2 may be chosen, for example, from the group consisting of the following reaction products: melamine polyphosphate, melam polyphosphate and melem polyphosphate, or a mixture thereof. It is particularly preferable to use a melamine polyphosphate containing chains with a length of greater than 2 and in particular greater than 10.

These compounds are especially described in patent WO 98/39306. Compounds F2 may also be obtained via processes other than those based on direct reaction with a phosphoric acid. For example, melamine polyphosphate may be prepared by reaction of melamine with polyphosphoric acid (see WO 98/45364), but also by condensation of melamine phosphate and of melamine pyrophosphate (see WO 98/08898).

In an entirely preferential manner, the fire-retardant system of the present invention comprises a compound F1 in which $R^1=R^2=$ethyl, M=aluminum and Z=3; and a compound F2: melamine polyphosphate. The weight ratio of compounds F1 and F2 may be, respectively, 3:2.

It is also possible to add to the formulation other compounds participating in the fire retardancy, for instance zinc borate, zinc oxide and magnesium hydroxide.

In the present invention, an amount of e) at least one flame retardant may be from 0 to 30.0 wt %, preferably 0 to 25.0 wt %, and more preferably 0 to 20.0 wt % with respect to the total weight of the composition. The range of concentration by weight of the e) at least one flame retardant, if contained in the composition of the present invention, may be from 5.0 to 30.0 wt %, preferably from 7.0 to 25.0 wt % with respect to the total weight of the composition.

In addition, the composition according to the present invention may optionally comprise f) at least one additive. Examples of the additives, which may be advantageously used, comprise, but are not limited to, a colorant, a lubricant, a light stabiliser, a heat stabiliser, a plasticizer, a nucleating agent, a surfactant, an antioxidant, an antistatic agent, a pigment, and the like.

In the present invention, an amount of f) at least one additive may be from 0 to 5.0 wt %, preferably 0 to 4.0 wt % with respect to the total weight of the composition. The range of concentration by weight of the additive, if contained in the composition of the present invention, may be from 0.2 to 4.0 wt %, preferably from 1.0 to 3.5 wt % with respect to the total weight of the composition.

The present invention also relates to a process for producing the polyamide composition according to the invention, which comprises melt-blending the a) at least one co-polyamide, the b) at least one semi-crystalline polyamide, and the c) at least one reinforcing filler. The composition according to the invention may be used as a raw material, for example, for the preparation of articles by injection molding, by injection/blow molding, by extrusion or by extrusion/blow molding, preferably by injection molding. According to an embodiment, the polyamide composition is extruded in the form of strands, for example, in a twin-screw extruder, and then chopped into granules. The molded parts are then prepared by melting said granules and feeding the molten composition into injection molding devices.

Another aspect of the present invention relates to molded parts produced by injection molding of the present composition.

Further aspect of the present invention relates to a use of the molded parts to produce housings or housing parts in various applications, including automotive applications, industrial machines, appliances, preferably automotive side mirror base plate and aesthetic parts, mobile phone frame, engine beauty cover, notebook frame, or electrical and electronic applications such as circuit breaker cases, magnetic switches, contactors, and connectors for electrical and electronics devices, also including photovoltaic power transmission devices and electrical vehicles, which require good surface features including excellent gloss performance during its service life, and also to said housings or housing parts. Other details or advantages of the present invention will become more clearly apparent through the examples given below. The present invention will be elucidated by the following examples, which are intended to demonstrate, but not to restrict the invention.

EXAMPLES

The compositions used in the Examples are as follows:

Inventive Examples 1-12 (Hereinafter, Ex 1-12)

Ex 1-6: mixtures of polyamide 6, polyamide 6,6 or co-polyamide 6,6/6T, PSB231, additives and 50.0 wt % of glass fibers Ex 7-12: similar to Ex 1-6, but with 20.0 wt % of flame retardant and 30.0 wt % of glass fibers Comparative Examples 1-8 (Hereinafter, CE 1-8)

CE 1-4: mixtures of polyamide 6, polyamide 6,6 or co-polyamide 6,6/6T, additives, and 50.0 wt % of glass fibers CE 5-8: similar to CE 1-4, but with 20.0 wt % of flame retardant and 30.0 wt % of glass fibers Chemical reagents used in the Examples are specified as follows:

PSB231: co-polyamide 6 comprising a mixture of terephthalic acid and isophorondiamine as co-monomers, manufactured by Solvay Polyamide 6: TOFLON® 1011 BRT available from Hyosung;

Polyamide 6,6: STABAMID® 26AE1 K PA66 available from Solvay Polyamide & Intermediates;

Co-polyamide 6,6/6T: STABAMID® 26UE1 available from Solvay Polyamide & Intermediates;

Co-polyamide 6/6,6: NOVAMID® 2430A available from DSM;

PA3426: amorphous co-polyamide 6T/6I available from DuPont de Nemour as Selar PA3426;

Glass fibers: 289H available from Nippon Electric Glass Co. Ltd.;

Flame retardant: EXOLIT® OP1400 available from Clariant;

Additives: colorant, antioxidant, etc.

The compositions prepared are detailed in Tables 1-3 below. The proportions are indicated in weight percentages in the composition.

TABLE 1

| | Component (in wt %) | | | | | | |
|---|---|---|---|---|---|---|---|
| | Ex 1 | Ex 2 | Ex 3 | Ex 3a | Ex 4 | Ex 5 | Ex 6 |
| Polyamide 6 | 41.5 | 31.5 | — | — | — | — | — |
| Polyamide 6,6 | — | — | 41.5 | 36.5 | 31.5 | — | — |
| Co-polyamide 6,6/6T | — | — | — | — | — | 41.5 | 31.5 |
| PSB231 | 5.0 | 15.0 | 5.0 | 5.0 | 15.0 | 5.0 | 15.0 |
| PA3426 | — | — | — | 5.0 | — | — | — |
| Glass fibers | 50.0 | 50.0 | 50.0 | 50.0 | 50.0 | 50.0 | 50.0 |
| Additives | 3.5 | 3.5 | 3.5 | 3.5 | 3.5 | 3.5 | 3.5 |
| Total | 100.0 | 100.0 | 100.0 | 100.0 | 100.0 | 100.0 | 100.0 |

TABLE 2

| | Component (in wt %) | | | | | | | |
|---|---|---|---|---|---|---|---|---|
| | Ex 7 | Ex 8 | Ex 9 | Ex 9a | Ex 9b | Ex 10 | Ex 11 | Ex 12 |
| Polyamide 6 | 41.5 | 31.5 | — | — | — | — | — | — |
| Polyamide 6,6 | — | — | 41.5 | 41.5 | 36.5 | 31.5 | — | — |
| Co-polyamide 6,6/6T | — | — | — | — | — | — | 41.5 | 31.5 |
| PSB231 | 5.0 | 15.0 | 5.0 | — | 5.0 | 15.0 | 5.0 | 15.0 |
| PA3426 | — | — | — | 5.0 | 5.0 | — | — | — |
| Flame retardant | 20.0 | 20.0 | 20.0 | 20.0 | 20.0 | 20.0 | 20.0 | 20.0 |
| Glass fibers | 30.0 | 30.0 | 30.0 | 30.0 | 30.0 | 30.0 | 30.0 | 30.0 |
| Additives | 3.5 | 3.5 | 3.5 | 3.5 | 3.5 | 3.5 | 3.5 | 3.5 |
| Total | 100.0 | 100.0 | 100.0 | 100.0 | 100.0 | 100.0 | 100.0 | 100.0 |

TABLE 3

| | Component (in wt %) | | | | | | | |
|---|---|---|---|---|---|---|---|---|
| | CE 1 | CE 2 | CE 3 | CE 4 | CE 5 | CE 6 | CE 7 | CE 8 |
| Polyamide 6 | 46.5 | — | — | — | 46.5 | — | — | — |
| Polyamide 6,6 | — | 46.5 | 31.5 | — | — | 46.5 | — | — |
| Co-polyamide 6,6/6T | — | — | — | 46.5 | — | — | 31.5 | 46.5 |
| PSB231 | — | — | — | — | — | — | — | — |
| Co-polyamide 6/6,6 | — | — | 15.0 | — | — | — | 15.0 | — |
| Flame retardant | — | — | — | — | 20.0 | 20.0 | 20.0 | 20.0 |
| Glass fibers | 50.0 | 50.0 | 50.0 | 50.0 | 30.0 | 30.0 | 30.0 | 30.0 |
| Additives | 3.5 | 3.5 | 3.5 | 3.5 | 3.5 | 3.5 | 3.5 | 3.5 |
| Total | 100.0 | 100.0 | 100.0 | 100.0 | 100.0 | 100.0 | 100.0 | 100.0 |

Ex 1-6 & CE 1-4: Formulations without Flame Retardant

Components were fed into a twin screw extruder through the use of gravimetric feeders, with optional partial premixing of components. Heating inside the extruder was carried out at a temperature higher or at least equal than the melting point of the highest melting polyamide component in the formula, to produce a molten polyamide resin compound. For instance, a composition of Ex 1 was obtained by premixing pellets of polyamide resins and additives together in a homogeneous way, then feeding them through a gravimetric hopper into a ZSK26 twin-screw extruder from Coperion, while feeding glass fibers through side-feeding zone 4 of the extruder, into the molten polymer. The extrusion temperatures were 280-280-280-280-280-280-280-280-280-270-260° C. from nozzle to hopper for polyamide66 resin, and the throughput and screw speed were 25 kg/hr and 300 RPM, respectively. The extrudates were then cooled in water at room temperature and chopped into pellets.

Ex 7-12 & CE 5-8: Formulations with Flame Retardant

A molten polyamide matrix was likewise produced. Compositions of Ex 7-12 were obtained by mixing said polyamide, flame retardant, and additives together into a hopper in the same extruder as used in Ex 1, while feeding glass fiber through side-feeding zone of the extruder by using each side feeder. The extrusion conditions were the same with those for Ex 1. The extrudates were likewise cooled in water at room temperature and chopped into pellets.

Subsequently, the pellets obtained as above were molten and fed into the injection molding device (LS Mtron LGE50II) so as to verify. The cylinder temperatures of the injection molding machine were 280-280-280-260-240° C. from nozzle to hopper. Flat rectangular specimens were then obtained by injection into a mold having a mirror-like surface, and with the dimensions of 60 mm×80 mm×2 mm.

With the specimens without flame retardant as above prepared (corresponding to Ex 1-6 and CE 1-4), gloss was measured by using a Micro-Tri-Glossmeter (BYK-Gardner), which confirms to the standards ISO 2813, DIN 67530, ASTM D 523 and BS 3900 Part D 5, in two locations of the specimen, five times per each location, and its average was indicated in Table 4 for the formulations without flame retardant as below.

TABLE 4

| | Gloss (60°, bottom) (GU) | Gloss (60°, middle) (GU) | Spiral length (mm) |
|---|---|---|---|
| CE 1 | 76.7 | 77.9 | 337 |
| Ex 1 | 77.2 | 78.9 | 368 |
| Ex 2 | 79.0 | 79.3 | 375 |
| CE 2 | 75.2 | 73.4 | 524 |
| Ex 3 | 76.1 | 75.8 | 569 |
| Ex. 3a | 79.8 | 80.4 | 546 |
| Ex 4 | 77.8 | 78.5 | 560 |
| CE 3 | 76.1 | 76.3 | 501 |
| CE 4 | 76.6 | 77.0 | 411 |
| Ex 5 | 78.1 | 79.2 | 429 |
| Ex 6 | 78.7 | 81.0 | 433 |

As being confirmed from all the above experimental data, better gloss was always obtained with the compositions according to the present invention in comparison with the comparative compositions. For instance, Ex 1 and Ex 2 exhibited 78.9 and 79.3 GU, separately, in comparison with CE 1, which showed 77.9 GU (all in middle position). Ex 1 and Ex 2 comprised PSB231 corresponding to the essential element a) of the present invention in an amount of 5.0 wt % and 15.0 wt %, respectively, whereas CE 1 did not comprise PSB231 while other constituents are similar to those of Ex 1 and Ex 2.

In addition, Ex 3 and Ex 5 exhibited better gloss than CE 2. Likewise, Ex 3 and Ex 4 comprised PSB231 in an amount of 5.0 wt % and 15.0 wt %, respectively, whereas CE 2 did not comprise PSB231. It was hence demonstrated that the presence of PSB231 enhanced the gloss performance of the polyamide composition In particular, CE 3 comprised a co-polyamide, not PSB231 but aliphatic co-polyamide 6/6,6. However, the presence of such a different co-polyamide 6/6,6 didn't result in better gloss. It was hence clearly demonstrated that PSB231, corresponding to the essential element of inventive composition, i.e., a co-polyamide comprising caprolactam monomer or the corresponding amino acid, at least one aromatic diacid co-monomer and at least one cycloaliphatic diamine co-monomer contributes the enhancement of gloss performance, and such enhancement couldn't be obtained by any type of co-polyamide.

In addition, it was also identified that the flowability of the inventive compositions were better than that of comparative compositions, in terms of spiral flow length as shown in Table 4. Spiral flow length is an accurate indicator determining the flow properties of a thermoplastic resin. Such melt flow properties for injection molding were tested by using a spiral mold based on the distance it flowed along a spiral runner of constant cross section, under controlled conditions of pressure and temperature (290° C. at nozzle and 80° C. at mold for polyamide 6,6).

With the specimens as prepared in the same manner as above, but with the presence of flame retardant (corresponding to Ex 7-12 and CE 5-8), gloss was measured and its average was indicated in Table 5 as below.

TABLE 5

| | Gloss (60°, bottom) (GU) | Gloss (60°, middle) (GU) |
|---|---|---|
| CE 5 | 77.0 | 78.0 |
| Ex 7 | 77.5 | 78.8 |
| Ex 8 | 80.7 | 80.2 |
| CE 6 | 66.1 | 63.6 |
| Ex 9 | 72.9 | 71.3 |
| Ex. 9a | 77.6 | 73.5 |
| Ex. 9b | 82.3 | 81.7 |
| Ex 10 | 80.8 | 79.6 |
| CE 7 | 72.9 | 72.9 |
| CE 8 | 80.2 | 75.1 |
| Ex 11 | 82.4 | 80.1 |
| Ex 12 | 86.1 | 86.0 |

As demonstrated in Table 5, always better gloss was measured with the inventive compositions in comparison with the comparative compositions. For instance, gloss (60°, middle) of Ex 11 and Ex 12 increased in proportion with the amount of PSB231, i.e., 80.1 GU and 86.0 GU, respectively, while CE 8 without PSB231 exhibited 75.1 GU of gloss. Best results were obtained in the presence of 5 wt % of an amorphous polyamide (6T/6I, Selar PA3426), see example Ex3a as compared to examples Ex3 and CE2 and example Ex9b as compared to examples Ex9, Ex9a and CE6.

The invention claimed is:

1. A polyamide composition comprising
   a) at least one co-polyamide comprising units of a caprolactam monomer or a corresponding amino acid, at least one aromatic diacid co-monomer and at least one cycloaliphatic diamine co-monomer;
   b) at least one semi-crystalline polyamide selected from the group consisting of polyamide 6, polyamide 6,6, polyamide 6,10, polyamide 4,6, polyamide 11, polyamide 12, polyamide 6,12, co-polyamide 6,6/6T, co-polyamide 6,10/6T, co-polyamide 6,12/6T, co-polyamide 12/6T, and co-polyamide 6/6T;
   c) at least one reinforcing filler; and
   d) at least one amorphous polyamide selected from the group consisting of polyamide 6I/6T, polyamide 6I/10T, and mixtures and co-polyamides thereof,
   wherein a) at least one co-polyamide has a crystallization temperature ($T_c$) of 150° C. or less and a difference between the melting temperature ($T_m$) and $T_c$ of 50° C. or more.

2. The polyamide composition according to claim 1, further comprising e) at least one flame retardant.

3. The polyamide composition according to claim 1, wherein a) at least one co-polyamide comprises at least 75 mol % of caprolactam monomer or the corresponding amino acid, based on a total number of moles of monomer and co-monomer units.

4. The polyamide composition according to claim 1, wherein c) at least one filler selected from the group consisting of glass fibres, glass beads, calcium carbonate, silicates, talc, kaolin, wollastonite, mica, wood powders, and powders and fibres of other natural products, and synthetic fibres.

5. The polyamide composition according to claim 1, further comprising f) at least one additive selected from the group consisting of a colorant, a lubricant, a light stabiliser, a heat stabiliser, a plasticizer, a nucleating agent, a surfactant, an antioxidant, an antistatic agent, a pigment, and any combination thereof.

6. The polyamide composition according to claim 1, comprising a) at least one co-polyamide in an amount of 2.0 to 30.0 weight % (wt %) with respect to the total weight of the composition.

7. The polyamide composition according to claim 1, comprising b) at least one semi-crystalline polyamide in an amount of 18.0 to 83.0 wt % with respect to the total weight of the composition.

8. The polyamide composition according to claim 1, comprising c) at least one reinforcing filler in an amount of 15.0 to 70.0 wt % with respect to the total weight of the composition.

9. The polyamide composition according to claim 1, comprising d) at least one amorphous polyamide in an amount of from 3.0 to 20.0 wt % with respect to the total weight of the composition.

10. A process for producing the polyamide composition according to claim 1, which comprises melt-blending the a) at least one co-polyamide, the b) at least one semi-crystalline polyamide, the c) at least one reinforcing filler, and the d) at least one amorphous polyamide.

11. Molded parts produced by injection or extrusion molding of the composition according to claim 1.

12. Housings or housing parts comprising the molded parts according to claim 11.

13. The polyamide compositions according to claim 1, wherein c) at least one filler is glass fibres.

14. The polyamide composition according to claim 1, wherein d) the amorphous polyamide is polyamide 6I/6T.

15. The polyamide composition according to claim 1, comprising a) at least one co-polyamide in an amount of 3.0 to 20.0 wt % with respect to the total weight of the composition.

16. The polyamide composition according to claim 1, comprising a) at least one co-polyamide in an amount of 5.0 to 15.0 wt % with respect to the total weight of the composition.

17. The polyamide composition according to claim 1, comprising c) at least one reinforcing filler in an amount of 20.0 to 50.0 wt % with respect to the total weight of the composition.

* * * * *